United States Patent [19]

Angermaier et al.

[11] Patent Number: 6,082,188
[45] Date of Patent: Jul. 4, 2000

[54] METHOD FOR DETECTING CYCLICAL COMBUSTION FLUCTUATIONS IN AN INTERNAL COMBUSTION ENGINE

[75] Inventors: Anton Angermaier, Thann; Stefan Schneider, Wenzenbach, both of Germany

[73] Assignee: Siemens Aktiengesellschaft, Munich, Germany

[21] Appl. No.: 09/103,167

[22] Filed: Jun. 22, 1998

Related U.S. Application Data

[63] Continuation of application No. PCT/DE96/02315, Dec. 3, 1996.

[30] Foreign Application Priority Data

Dec. 21, 1995 [DE] Germany ............... 195 48 059

[51] Int. Cl.$^7$ ............... G01M 15/00; G01L 3/26
[52] U.S. Cl. ............... 73/117.3; 73/115
[58] Field of Search ............... 73/117.3, 115

[56] References Cited

U.S. PATENT DOCUMENTS

| | | | |
|---|---|---|---|
| 5,041,980 | 8/1991 | Maddock et al. ............... | 73/116 |
| 5,433,107 | 7/1995 | Angermaier et al. ............... | 73/117.3 |
| 5,446,664 | 8/1995 | Vossen et al. ............... | 73/117.3 |
| 5,574,217 | 11/1996 | McCombie ............... | 73/116 |

FOREIGN PATENT DOCUMENTS

| | | |
|---|---|---|
| 0576705A1 | 1/1994 | European Pat. Off. . |
| 4002209A1 | 8/1991 | Germany . |
| 4208033C1 | 5/1993 | Germany . |
| 4042093C2 | 11/1994 | Germany . |

*Primary Examiner*—Eric S. McCall
*Assistant Examiner*—Octavia Davis
*Attorney, Agent, or Firm*—Herbert L. Lerner; Laurence A. Greenberg; Werner H. Stemer

[57] ABSTRACT

Nonconcentricity or lack of smoothness values are proportional to the change in angular speed of the crankshaft. Deviation values that are proportional to the cyclical combustion fluctuations are ascertained, after the nonconcentricity values of successive combustion cycles are averaged, by comparison of the current nonconcentricity value with the associated mean value. Then the deviation quantity is compared with an individual-cylinder-specific limit value, and cyclical combustion fluctuations are deduced if the deviation quantity exceeds a limit value.

16 Claims, 4 Drawing Sheets

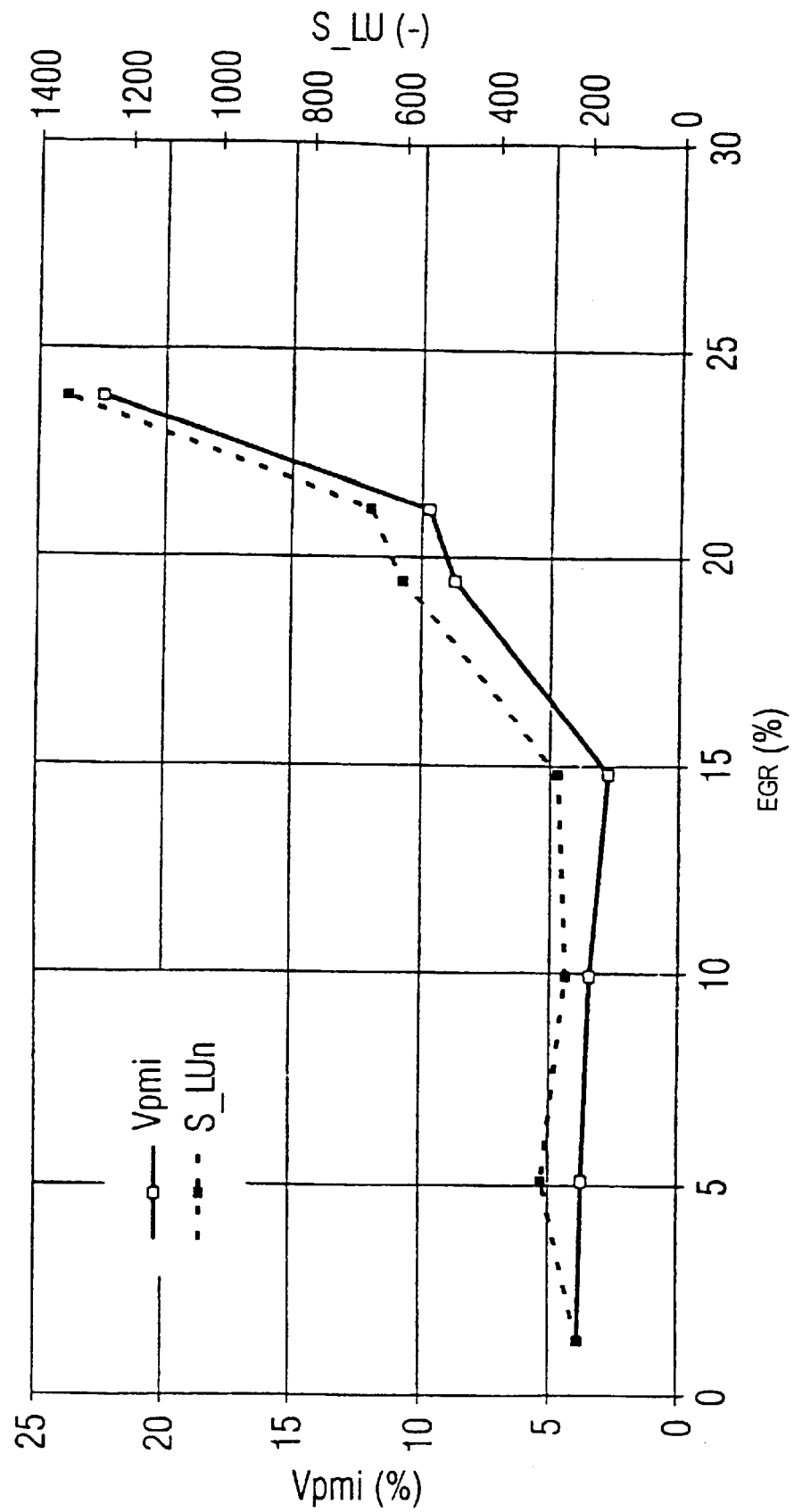

METHOD FOR DETECTING CYCLICAL COMBUSTION FLUCTUATIONS IN AN INTERNAL COMBUSTION ENGINE

CROSS-REFERENCE TO RELATED APPLICATION

This is a continuation of copending international application PCT/DE96/02315, filed Dec. 3, 1996, which designated the United States.

BACKGROUND OF THE INVENTION

1. Field of the Invention

The invention relates to internal combustion engines and, more particularly, to a method for detecting cyclical fluctuations in combustion in an internal combustion engine.

Operating internal combustion engines with lean mixtures and/or high exhaust gas recirculation rates offers a good opportunity to reduce fuel consumption and nitrogen oxide emissions. Extremely lean mixtures, of the kind that occur in lean engines with typical air numbers of around $\lambda \approx 1.4$ or a high proportion of inert gases in the mixture as a result of the exhaust gas recirculation, however, have poorer flammability of the mixture as a consequence. That can lead to an increase in cyclical combustion fluctuations and even to combustion misfires, if the recirculation rates are too high or the mixtures are too lean.

For reliable operation of internal combustion engines at high recirculation rates or lean mixtures, it is therefore necessary to detect and weight the cyclical combustion fluctuations. Combustion in the cylinder of an internal combustion engine can be measured by measuring the cylinder pressure course with ensuing calculation of such characteristic variables as the indexed mean pressure. The cyclical fluctuations in these variables are directly proportional to the cyclical combustion fluctuations.

It has been known in the art to measure and evaluate the crankshaft speed in order to detect combustion misfires. In that process the period of time during which the crankshaft rotates by a certain angular extent, also called a segment, is measured. Combustion misfires lead to a temporary slowdown in the angular speed of the crankshaft and thus to an increase in the difference between successive periods of time.

U.S. Pat. No. 5,433,107 (EP 0 576 705 A1) describes a method for detecting combustion misfires via fluctuations in the angular speed of the crankshaft. There, the general trend of the engine speed and in addition non-uniform changes in the speed are taken into account. The method described there furnishes a nonconcentricity value $LU_n$ (referred to as "lack of smoothness value") which is proportional to the change in the angular speed of the crankshaft. The nonconcentricity value thus obtained is then compared with a limit value, and a combustion misfire is determined if the nonconcentricity value exceeds the limit value.

SUMMARY OF THE INVENTION

It is accordingly an object of the invention to provide a method of detecting cyclical combustion fluctuations and misfires in internal combustion engines, which overcomes the above-mentioned disadvantages of the prior art devices and methods of this general type and which, inter alia, assures the reliable detection of transitional range between stable combustion and the first incidence of combustion misfires.

With the foregoing and other objects in view there is provided, in accordance with the invention, a method of detecting cyclical combustion fluctuations in a multicylinder internal combustion engine, which comprises the following steps:

ascertaining a nonconcentricity value for each cylinder of a multicylinder internal combustion engine, wherein the nonconcentricity value is proportional to a change in an angular speed of engine crankshaft;

calculating a mean value from nonconcentricity values ascertained during successive combustion cycles individually for each cylinder;

determining a deviation quantity, which is proportional to cyclical combustion fluctuations, by comparing a current nonconcentricity value with mean value for the respective cylinder;

comparing the deviation quantity with an individual-cylinder-specific limit value; and deducing that the combustion in the engine is cyclically fluctuating if the comparison in the comparing step does not meet a predetermined condition.

In other words, a variable that is proportional to the cyclical combustion fluctuations is derived by the statistical evaluation of nonconcentricity values (lack of smoothness values), which have been ascertained by an arbitrary method on the basis of fluctuations in the angular speed of the crankshaft. Thus the transitional range between stable combustion and the first incidence of combustion misfires can be reliably detected.

In accordance with an added feature of the invention, the mean value is calculated with one of the following equations:

$$MW\_LU_n = MW\_LU_{nold} + (LU_n - MW\_LU_{nold})\frac{1}{i}$$

$$MW\_LU_n = \frac{1}{i}\sum_{j=1}^{i} LU_{nj}$$

$$MW\_LU_n = \sqrt[i]{LU_{n1}LU_{n2}...LU_{ni}}$$

where $MW\_LU$ is the mean value, $LU$ is the nonconcentricity value, $i$ is a number of combustion cycles, $n$ is a cylinder segment index, and $j$ is a combustion cycle index.

In accordance with an additional feature of the invention, the deviation quantity is calculated with one of the following rule:

$$S\_LU_n\sqrt{\frac{1}{i-1}(\sum LU_n^2 - MW\_LU_n \sum LU_n)}$$

$$S\_LU_n = MW\_LU_n^2 - LU_n^2$$

$$S\_LU_n = |MW\_LU_n| - |LU_n|$$

$$S\_LU_n = |MW\_LU_n - LU_n|$$

$$S\_LU_n = \sqrt{|MW\_LU_n^2 - LU_n^2|}$$

where $S\_LU$ is the deviation quantity, $i$ is a number of combustion cycles, and $n$ is a cylinder segment index.

In accordance with another feature of the invention, the predetermined condition is satisfied when the deviation quantity exceeds the limit value.

In accordance with a further feature of the invention, the deducing step comprises forming a difference between the deviation quantity and the limit value, and cyclical combustion fluctuations in the internal combustion engine are determined if the difference exceeds a further predetermined limit value.

In accordance with again another feature of the invention, a quotient is formed of the deviation quantity and the limit value in accordance with the equation $$Q\_LU_n = S\_LU_n / S\_LU_{gn}$$

wherein $Q\_LU_n$ is the quotient, $S\_LU_n$ is the deviation quantity, and $S\_LU_{gn}$ is the limit value, and wherein the deducing step comprises deducing cyclical combustion fluctuations if the quotient is greater than 1.

In accordance with again an additional feature of the invention, unstable combustion is determined due to cyclical combustion fluctuations only after a statistical frequency with which the limit value is exceeded by the deviation quantity exceeds a given limit.

In accordance with again a further feature of the invention, the individual-cylinder-specific limit values are stored in maps of a memory of a control unit in dependence on engine operating parameters.

In accordance with a concomitant feature of the invention, if cyclical combustion misfires are detected, control steps for stabilizing combustion are initiated. The control steps include adjusting an ignition timing, varying an air ratio, and/or an exhaust gas recirculation rate.

Other features which are considered as characteristic for the invention are set forth in the appended claims.

Although the invention is illustrated and described herein as embodied in a method for detecting cyclical fluctuations in combustion in an internal combustion engine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 4 is a graph showing the course of a deviation and a fluctuation for the indexed mean pressure at various exhaust gas recirculation rates.

DESCRIPTION OF THE PREFERRED EMBODIMENTS

Figure 1:
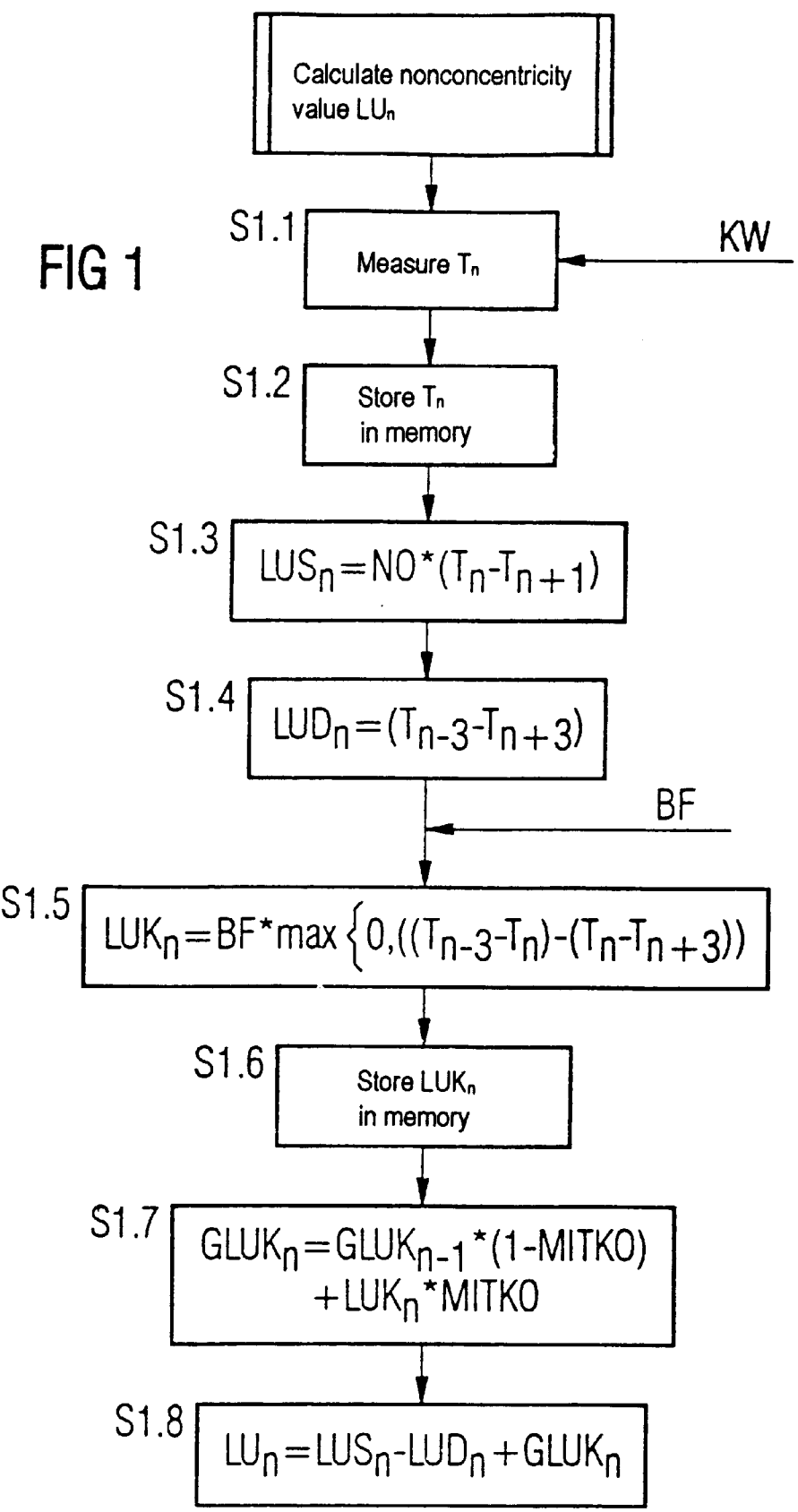
FIG. 1 is a flowchart for determining a nonconcentricity value.
Figure 2:
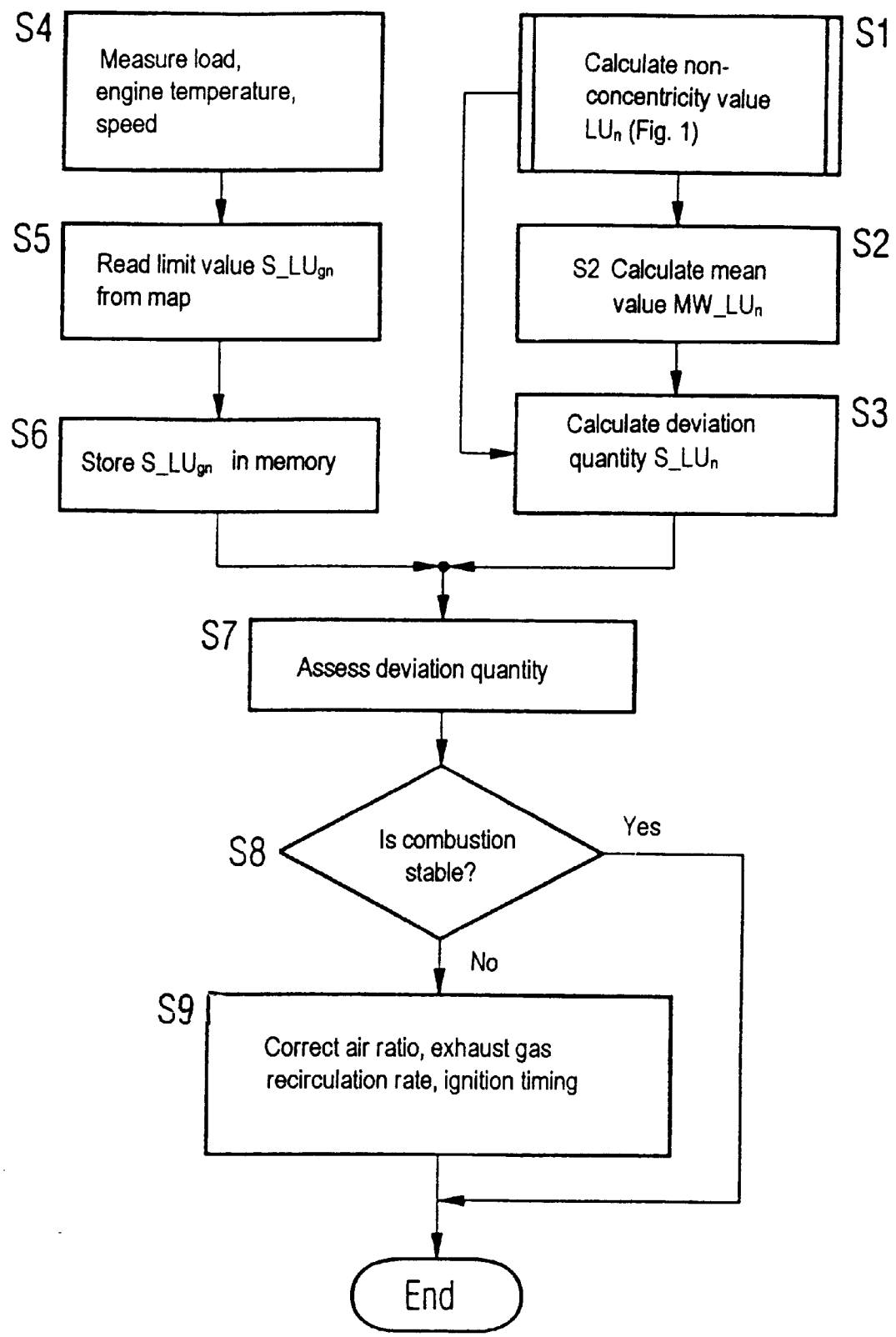
FIG. 2 is a flowchart for detecting a transitional range between stable combustion and a first incidence of combustion misfires.

Referring now to the figures of the drawing in detail and first, particularly, to FIGS. 1 and 2 thereof, a program step S1 deals with the calculation of a nonconcentricity value. The subroutine may be realized in accordance with the above-noted U.S. Pat. No. 5,433,107, which is herewith incorporated by reference. The routine is explained with reference to the flowchart of FIG. 1.

In method step S1.1, the periods of time $T_n$ that the crankshaft requires to rotate by a certain crankshaft angle during the working stroke of one cylinder, or in other words 180° of crankshaft angle KW for a four-cylinder engine, are measured on the basis of markings on the crankshaft.

The values that are continuously measured are buffer-stored in method step S1.2.

In method step S1.3, a static component $LUS_n$ is calculated from two successive periods of time $T_n$, $T_{n+1}$.

The standardizing factor NO used here is dependent on the measurement window (n−x through n+y), which is used in method step S1.4 in calculating the dynamic component. It is calculated by the equation NO=x+y, or in other words in this exemplary embodiment NO=3+3=6.

In the method step S1.4, the dynamic component $LUD_n$ is calculated by forming the difference between periods of time that are located farther apart. In this exemplary embodiment, the third most recent time period $T_{n-3}$ and the third subsequent time period from now, $T_{n+3}$, are used, referred to the current time period $T_n$. Here it is also possible to use a measurement window located asymmetrically with respect to the current time period $T_n$. The dynamic component $LUD_n$ is subsequently inverted, i.e., negatived.

In method step S1.5, a variation component $LUK_n$ is calculated. Two differential values are formed symmetrically to the current time period $T_n$, in the exemplary embodiment $T_{n-3} - T_n$ and $T_n - T_{n+3}$. From these two values in turn a difference is formed, and if the difference is greater than zero it is weighted with a weighting factor BF. If the difference is less than zero, then it is set at zero.

The variation component $LUK_n$ thus calculated is buffer-stored in method step S1.6 and then in method step S1.7 subjected to a sliding averaging operation, in this case by way of example in accordance with the formula $GLUK_n = GLUK_{n-1}*(1-MITKO)+LUK_n*MITKO$, where MITKO represents an averaging constant with a range of values between 0 and 1.

The measurement windows (n, n−x, n+y, n−z, n+z) in calculating the dynamic component and the variation component are advantageously selected such that for the corresponding cylinders n, n−x, n+y, n−z, n+z, the time period of the same mechanical segment of the crankshaft is measured. Any inequality that may be present in the magnitude of the individual crankshaft segments will then not cause any measurement error.

From these individual components, in method step S1.8 the nonconcentricity value $LU_n$ for the time period $T_n$ in question is now formed by adding the individual components.

The nonconcentricity value $LU_n$ is used in the further method steps to ascertain a variable which is proportional to the cyclical combustion fluctuations. However, any kind of nonconcentricity value that is proportional to the variation in the angular speed of the crankshaft and is obtained by an arbitrary known method can be employed as the output variable for further processing.

Referring now to FIG. 2, a mean value $MW\_LU_n$ of the nonconcentricity values $LU_n$ of successive combustion cycles is first calculated individually for each cylinder in method step S2. The calculation may be based on various equations:

$$MW\_LU_n = MW\_LU_{nold} + (LU_n - MW\_LU_{nold})\frac{1}{i} \quad \text{a)}$$

$$MW\_LU_n = \frac{1}{i}\sum_{j=1}^{i} LU_{nj} \quad \text{b)}$$

$$MW\_LU_n = \sqrt[i]{LU_{n1} LU_{n2} ... LU_{ni}} \quad \text{c)}$$

where n=cylinder segment, j=combustion cycle, and i=number of cycles.

By determining a deviation quantity $S\_LU_n$, a comparison of the current nonconcentricity value $LU_n$ with the mean value $MW\_LU_n$ for the applicable cylinder is made. This deviation quantity may be used as a value that is proportional to the cyclical combustion fluctuations. The deviation quantity $S\_LU_n$ in method step S3 can be calculated by various calculation rules:

$$S\_LU_n \sqrt{\frac{1}{i-1}(\sum LU_n^2 - MW\_LU_n \sum LU_n)} \quad \text{a)}$$

$$S\_LU_n = MW\_LU_n^2 - LU_n^2 \quad \text{b)}$$

$$S\_LU_n = |MW\_LU_n| - |LU_n| \quad \text{c)}$$

$$S\_LU_n = |MW\_LU_n - LU_n| \quad \text{d)}$$

$$S\_LU_n = \sqrt{|MW\_LU_n^2 - LU_n^2|} \quad \text{e)}$$

where n=cylinder segment, and i=number of cycles.

As the mean value $MW\_LU_n$ in these prescribed calculations, each of the above-described mean values can be used.

In order to ascertain whether the cyclical combustion fluctuations have exceeded an allowable limit value, a comparison is made of the deviation quantity $S\_LU_n$ with an individual cylinder-specific limit value $S\_LU_{gn}$, in method step S7. Parallel to the calculation of the nonconcentricity value, the mean value and the deviation quantity in method steps S1–S3, the operating parameters of engine speed (rpm), load and temperature are measured (method step S4). As a function of these values, the associated limit values $S\_LU_{gn}$ are read out from maps of a memory of the electronic control unit of the engine and are stored in memory (method steps S5 and S6). The assessment of the deviation quantity and the ensuing question whether the combustion process is still proceeding in stable fashion (method steps S7 and S8) can be done in various ways:

a) If the deviation quantity $S\_LU_n$ is greater than the limit value $S\_LU_{gn}$, then it is ascertained that the cyclical combustion fluctuations have exceeded a certain value, and that the combustion is unstable. If not, a stable combustion is recorded, and the process is terminated.

b) The difference between the deviation quantity $S\_LU_n$ and the limit value $S\_LU_{gn}$ is formed in accordance with the equation $D\_LU_n = S\_LU_{gn} - S\_LU_n$. As a result, it is possible not only to detect the transition from stable to unstable combustions but also to weight the intensity of the cyclical combustion fluctuations.

c) The quotient of the deviation quantity $S\_LU_n$ and the limit value $S\_LU_{gn}$ is formed in accordance with the equation $Q\_LU_n = S\_LU_n / S\_LU_{gn}$. If this quotient is less than or equal to 1, then the combustion is stable. If the value is greater than 1, the combustion is determined to be unstable. From the value of the quotient, weighting of the intensity of the cyclical combustion fluctuations is possible.

d) A further possibility for weighting is offered by a statistical evaluation of the number of times the limit value is exceeded (limit value $S\_LU_{gn}$) by the deviation quantity $S\_LU_n$. In this operation the combustion is not assessed to be unstable unless the statistical frequency of exceeding of the limit value exceeds a certain limit.

If a combustion is determined to be unstable, that is, if the cyclical combustion fluctuations exceed a defined amount, then the combustion is stabilized by means of a suitable intervention into the ignition, the air ratio, or the exhaust gas recirculation (method step S9). For instance, in internal combustion engines with exhaust gas recirculation, if unstable combustion is detected, the recirculation rate can be reduced or the ignition angle can be retarded. In engines that are operated with a lean mixture, enriching the mixture or advancing the ignition angle leads to a stabilization of combustion. If along with the actual detection of unstable combustion the intensity of the cyclical fluctuations is also weighted, then the weighting can be utilized as an input variable for regulating the exhaust gas recirculation rate, the air ratio, or the ignition angle.

Figure 3:
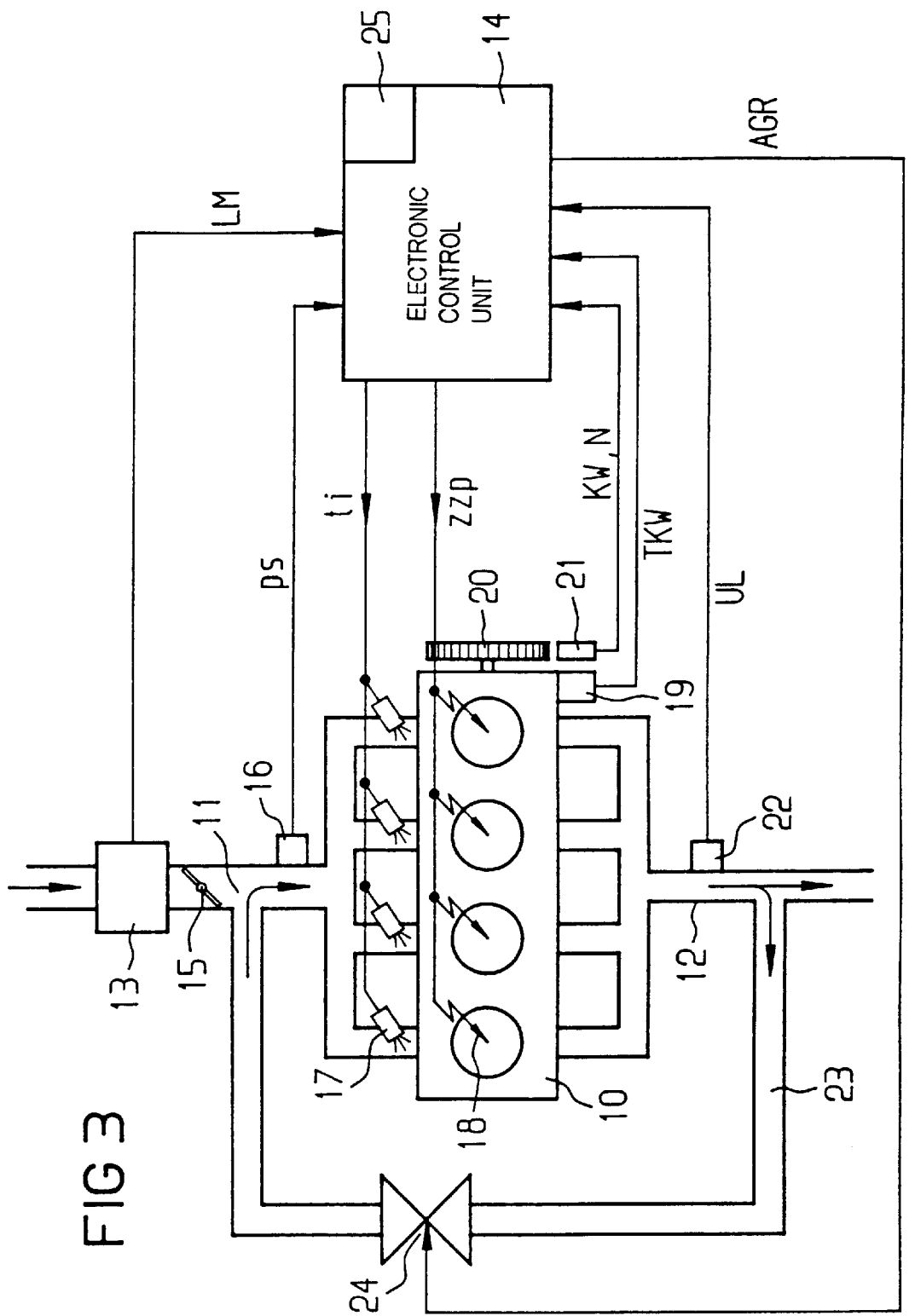
FIG. 3 is a schematic block diagram of a device having the measurement points and actuators for performing the method.

In FIG. 3, a block diagram of a device for performing the method of the invention for detecting combustion fluctuations is shown. It has an engine block 10 with four cylinders of an internal combustion engine. An intake manifold 11 is connected to the engine. The intake manifold 11 has a number of individual intake tubes corresponding to the number of cylinders, and an exhaust gas system 12. An air mass meter 13 is disposed in the intake manifold 11. It outputs an output signal LM in accordance with the aspirated air to an electronic control unit 14. Also disposed in the intake manifold is a throttle valve 15 used to control the filling and a sensor 16 for detecting the intake pressure (ps). Each of the cylinders of the engine is assigned one injection valve 17, which can be triggered via respective suitable injection pulses ti, and an ignition device 18, which is shown only symbolically in the drawing and whose ignition timing zzp can likewise be adjusted via signals of the control unit 14.

Also disposed on the engine at some suitable point is a sensor 19 for detecting the temperature of the engine block 10 or the temperature of the coolant TKW. A transducer wheel 20 is connected to the crankshaft of the engine and has markings that are scanned by a sensor 21, which outputs a signal to the control unit 14 that represents the engine speed N (rpm) and the absolute crankshaft angle KW.

A lambda sensor 22 is disposed in the exhaust system 12; it outputs a signal UL corresponding to the residual oxygen content in the exhaust gas to the control unit 14. A line 23 branches off from the exhaust system 12 and discharges downstream of the throttle valve 15 into the intake manifold 11. Exhaust gas can thereby be recirculated and admixed with the fresh air at certain operating points of the engine. With the aid of an exhaust gas recirculation valve 24 which is inserted into the line 23 and can be activated via control signals from the control unit 14, the quantity of recirculated exhaust gas, or in other words the exhaust gas recirculation rate AGR can be adjusted.

The key element of the control unit 14 is a microcomputer, which controls all the functions required for engine operation in accordance with defined programs. A program routine executes the described method for detecting combustion fluctuations. The maps required for this purpose are stored in the memory 25 of the control unit 14.

One example for the course of a deviation quantity (in this case $S\_LU_n$ in accordance with prescribed calculation a) with a mean value $MW\_LU_n$ ascertained by equation b)), for various exhaust gas recirculation rates, is shown in FIG. 4. At the same time, the course of a fluctuation extent of the indexed mean pressure is plotted. At high recirculation rates, both the mean pressure fluctuations and the deviation quantities rise. This rise can be ascribed to an increase in cyclical combustion fluctuations.

We claim:

1. A method of detecting cyclical combustion fluctuations in a multicylinder internal combustion engine, which comprises the following steps:

ascertaining a nonconcentricity value for each cylinder of a multicylinder internal combustion engine, wherein the nonconcentricity value is proportional to a change in a speed of the engine;

calculating a mean value from nonconcentricity values ascertained during successive combustion cycles individually for each cylinder;

determining a deviation quantity, which is proportional to cyclical combustion fluctuations, by comparing a current nonconcentricity value with mean value for the respective cylinder;

comparing the deviation quantity with an individual-cylinder-specific limit value; and deducing that the combustion in the engine is cyclically fluctuating if the comparison in the comparing step does not meet a predetermined condition.

2. The method according to claim 1, wherein the step of calculating the mean value comprises calculating with the following equation:

$$MW\_LU_n = MW\_LU_{nold} + (LU_n - MW\_LU_{nold})\frac{1}{i}$$

where MW_LU is the mean value, LU is the nonconcentricity value, i is a number of combustion cycles, and n is a cylinder segment index.

3. The method according to claim 1, wherein the step of calculating the mean value comprises calculating with the following equation:

$$MW\_LU_n = \frac{1}{i}\sum_{j=1}^{i} LU_{nj}$$

where MW_LU is the mean value, LU is the nonconcentricity value, i is a number of combustion cycles, n is a cylinder segment index, and j is a combustion cycle index.

4. The method according to claim 1, wherein the step of calculating the mean value comprises calculating with the following equation:

$$MW\_LU_n = \sqrt[i]{LU_{n1}LU_{n2}...LU_{ni}}$$

where MW_LU is the mean value, LU is the nonconcentricity value, i is a number of combustion cycles, and n is a cylinder segment index.

5. The method according to claim 1, wherein the step of determining the deviation quantity comprises calculating with the following rule:

$$S\_LU_n\sqrt{\frac{1}{i-1}(\sum LU_n^2 - MW\_LU_n \sum LU_n)}$$

where S_LU is the deviation quantity, MW_LU is the mean value, LU is the non-concentricity value, i is a number of combustion cycles, and n is a cylinder segment index.

6. The method according to claim 1, wherein the step of determining the deviation quantity comprises calculating with the following rule:

$$S\_LU_n = MW\_LU_n^2 - LU_n^2$$

where S_LU is the deviation quantity, MW_LU is the mean value, LU is the non-concentricity value, and n is a cylinder segment index.

7. The method according to claim 1, wherein the step of determining the deviation quantity comprises calculating with the following rule:

$$S\_LU_n = |MW\_LU_n| - |LU_n|$$

where S_LU is the deviation quantity, MW_LU is the mean value, LU is the non-concentricity value, and n is a cylinder segment index.

8. The method according to claim 1, wherein the step of determining the deviation quantity comprises calculating with the following rule:

$$S\_LU_n = |MW\_LU_n - LU_n|$$

where S_LU is the deviation quantity, MW_LU is the mean value, LU is the non-concentricity value, and n is a cylinder segment index.

9. The method according to claim 1, wherein the step of determining the deviation quantity comprises calculating with the following rule:

$$S\_LU_n = \sqrt{|MW\_LU_n^2 - LU_n^2|}$$

where S_LU is the deviation quantity, MW_LU is the mean value, LU is the non-concentricity value, and n is a cylinder segment index.

10. The method according to claim 1, which further comprises carrying out the deducing step by deducing that the combustion in the engine is cyclically fluctuating if the comparison in the comparing step reveals that the deviation quantity exceeds the individual-cylinder-specific limit value.

11. The method according to claim 1, wherein the deducing step comprises forming a difference between the deviation quantity and the limit value, and determining cyclical combustion fluctuations in the internal combustion engine if the difference exceeds a further predetermined limit value.

12. The method according to claim 1, which further comprises forming a quotient of the deviation quantity and the limit value in accordance with the equation $$Q\_LU_n = S\_LU_n/S\_LU_{gn}$$

wherein $Q\_LU_n$ is the quotient, $S\_LU_n$ is the deviation quantity, and $S\_LU_{gn}$ is the limit value, and wherein the deducing step comprises deducing cyclical combustion fluctuations if the quotient is greater than 1.

13. The method according to claim 1, which further comprises determining unstable combustion due to cyclical combustion fluctuations after a statistical frequency, with which the limit value is exceeded by the deviation quantity, exceeds a given limit.

14. The method according to claim 1, which comprises storing the individual-cylinder-specific limit values in maps of a memory of a control unit in dependence on engine operating parameters.

15. The method according to claim 1, which further comprises, if cyclical combustion misfires are detected, initiating control steps for stabilizing combustion.

16. The method according claim 1, wherein the control steps include adjusting an ignition timing, varying an air ratio, and an exhaust gas recirculation rate.

* * * * *